(12) United States Patent
Verweg et al.

(10) Patent No.: US 10,146,387 B2
(45) Date of Patent: Dec. 4, 2018

(54) CAPACITIVE TOUCH PANEL DEVICE HAVING ELECTRICALLY-RESISTIVE LAYER

(71) Applicants: INNOCOM TECHNOLOGY (SHENZHEN) CO., LTD., Shenzhen, Guangdong Province (CN); INNOLUX CORPORATION, Jhu-Nan, Miao-Li County (TW)

(72) Inventors: Frans Verweg, Jhu-Nan (TW); Serge Toussaint, Jhu-Nan (TW); David Yeates, Jhu-Nan (TW)

(73) Assignees: INNOCOM TECHNOLOGY (SHENZHEN) CO., LTD., Shenzhen (CN); INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 15/364,229

(22) Filed: Nov. 29, 2016

(65) Prior Publication Data

US 2017/0083131 A1   Mar. 23, 2017

Related U.S. Application Data (63) Continuation of application No. 13/472,388, filed on May 15, 2012, now abandoned.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 4,644,101 A | 2/1987 | Jin et al. | |
| 6,323,846 B1 * | 11/2001 | Westerman | G06F 3/0235 |
| | | | 345/173 |
| 8,115,499 B2 | 2/2012 | Osoinach et al. | |
| 2003/0067447 A1 * | 4/2003 | Geaghan | G06F 3/0416 |
| | | | 345/173 |

(Continued)

FOREIGN PATENT DOCUMENTS

| | | |
|---|---|---|
| CN | 201725120 U | 1/2011 |
| TW | 201102899 | 1/2011 |

OTHER PUBLICATIONS

Office Action dated Dec. 26, 2014, issued by Taiwan Intellectual Property Office.

(Continued)

*Primary Examiner* — Chun-Nan Lin
(74) *Attorney, Agent, or Firm* — Liu & Liu (57) ABSTRACT

A touch panel device including, and arranged above each other in a downward direction, a cover layer, a sensor layer including a plurality of sensing elements, characterized in that between the cover layer and the sensor layer is an electrically-resistive layer, electrically resistive layer being an electrically non-insulating layer and having an electrical resistance is provided, wherein the electrical resistance of the electrically-resistive layer is lower than the electrical resistance of the cover layer and higher than the electrical resistance of the sensing elements.

14 Claims, 7 Drawing Sheets

(56) References Cited

U.S. PATENT DOCUMENTS

| | | | |
|---|---|---|---|
| 2003/0213624 A1 | 11/2003 | Cross et al. | |
| 2009/0244027 A1* | 10/2009 | Yoshida | C08J 7/047 |
| | | | 345/174 |
| 2010/0001973 A1* | 1/2010 | Hotelling | G02F 1/13338 |
| | | | 345/174 |
| 2010/0097344 A1 | 4/2010 | Verweg | |
| 2012/0169647 A1 | 7/2012 | Kuo | |
| 2013/0050144 A1 | 2/2013 | Reynolds | |

OTHER PUBLICATIONS

Office Action dated Oct. 27, 2015, issued by State Intellectual Property Office of the People's Republic of China.

\* cited by examiner

CAPACITIVE TOUCH PANEL DEVICE HAVING ELECTRICALLY-RESISTIVE LAYER

This application is a continuation application of co-pending U.S. application Ser. No. 13/472,388, filed May 15, 2012, the subject matter of which is incorporated herein by reference.

FIELD OF THE INVENTION

The invention relates to capacitive touch panel devices. The invention further relates to a method for determining a touch location on a capacitive touch panel device, and to an electronic apparatus comprising a display and a touch panel device.

BACKGROUND OF THE INVENTION

Capacitive touch panel devices are widely used to allow user interaction with electronic devices. In particular, a transparent touch panel can be used on top of a display device to allow a user to interact with the electronic device via a graphical user interface presented on the display device. Such touch panels are used in for example mobile phones, tablet computers, and other portable devices.

A known touch panel for use with such devices comprises a glass plate provided with a first electrode comprising a plurality of first sensing elements on one face of the glass plate, and a second electrode on an opposite face of the glass plate. The core operating principle is that the touch panel is provided with means for determining (changes in) the capacity between any of the first sensing elements of the first electrode and the second electrode. Such change in capacitance is attributed to a touch event, sometimes also called a gesture or touch gesture. By determining the position of the sensing element where the change in capacitance is maximized, the central position of the touch event is determined.

In coplanar touch panels the sensors are located in one single (Indium Tin Oxide, ITO) layer and each sensor has its own sense circuitry. Coplanar touch technology uses differential capacitance measurements in combination with a coplanar touch sensor panel. The sense circuit measures the charge that is required to load the intrinsic capacitance of each individual sensor and in addition (if applicable) the finger-touch-capacitance for those sensors that are covered/activated by the touch event. The intrinsic capacitance of the sensor depends on the sensor area, distance to a reference (voltage) layer and the dielectric constant of the materials between sensor and this reference layer. Assuming that the intrinsic capacitance is stable and constant over time, this is accounted for during the tuning/calibration procedure. The variation of sensor capacitance due to a touch event will then be the discriminating factor revealing where the touch is located.

The accuracy performance of a touch panel is the most important characteristic of the functionality of a touch panel as it shows the capability of recognizing a touch event on the same position as the actual spot location of the physical touch. Next to this, a high accuracy will improve the ability of determining the shape and size of the touch event. Moreover, a high spatial accuracy performance of a touch display will enable to correctly recognize stylus input (i.e. touches with a relative small impact diameter<4 mm).

In general, the accuracy of a touch panel with a fixed size will increase by enlarging the sensor density i.e. the total number of active touch sensors per display area. With a larger sensor density per area, not only the position, but also the shape and size of the touch can be detected with more accuracy. For a typical touch application of a pixilated display panel, (in which as a response of the touch event, part of the display will be activated/selected), the ultimate touch sensor dimension will be equal to the display pixel sensor or in other words: the maximum accuracy can be achieved when the touch sensor density is equal to the Pixels-Per-Inch (PPI) value of the display.

For various reasons, such as costs, design and process capability (track/gap capabilities) and display form factor (e.g. availability for track/routing layout) the number of I/O of the touch driver/controller will be limited. Consequently, the number of touch sensors of a touch panel of a display module will, in general, be much smaller than the actual number of display pixels which will have its negative impact on the achievable accuracy. Normally, for stylus input (i.e. with only a small area touching the surface, <4 mm diameter), a relatively higher accuracy is requested than for a finger input (with larger area touching the touch panel, i.e. 9 mm diameter). This is because a stylus input is related to typical touch display functionalities such as line drawing and hand-writing which requires a small spatial input (and recognition).

Especially, in the situation when the sensor size dimensions of the touch panel are larger than the physical touch contact area (e.g. finger touch size, stylus point size) a 'death area' can occur: i.e. the finger or stylus can move around for a certain small distance at the center of a sensor. In this case, the touch panel will not register these small movements being located within one single sensor outline.

SUMMARY OF THE INVENTION

It is an object of the invention to increase the accuracy performance of a touch panel with a fixed lay-out (i.e. fixed number of sensors, with a fixed area per sensor).

The invention provides a touch panel having a high-resistive layer at a location above of the sensor layer. The functionality of this added layer will be to spread out the electrical field between the physically touch contact area towards the array of sensors that is positioned underneath the added layer. The number of sensors that will sense a (part of the) capacitive difference due to the finger touch capacitance will be increased by this layer. The typical resistance of the additional layer should be large enough to avoid that the layer will act as a (conductive) shielding layer (typically>1-5 MOhm) but small enough in order that it will not act as fully electrical insulator<<$10^8$ MOhm). As a consequence of the added layer, a touch event will not only build up a capacitance between the physical touch input area and the sensor array, but via the added resistive layer a larger so called 'fringe field' area will be established, in which a larger area of the sensor array will be sensing a capacitance variation.

As a consequence, as more sensors are 'affected' by the touch event, by applying a dedicated algorithm to calculate the touch position, a higher accuracy can be achieved. Especially in the case of relative small touch input areas (e.g. at stylus input<4 mm), the number of sensors involved in the determination of the position could be increased and consequently the accuracy could be improved. In effect, the "dead area" of a touch sensor is reduced through the capacitive spreading effect of the resistive layer.

In an embodiment according the invention, such an added layer with high resistance, but still not totally electrically insulating, for causing the mentioned 'fringe field' around a touch event is implemented as a (very thin) but high resistive ITO layer on the cover window.

Other options are possible, as long as the layer is situated in between the touched area and the sensor layer. In an embodiment, an anti-static layer in the polarization stack-up is made resistive in order to achieve the fringe field, if a polarization layer is situated between the touch input and sensor array.

In an embodiment according the invention, a touch panel device is provided wherein, arranged above each other in a downward direction, a cover layer for use as a touch surface and a sensor layer comprising sensing elements are arranged. Between the cover layer and the sensor layer, an electrically resistive layer is provided. The resistive layer has an electrical resistance. The electrical resistance of the resistive layer may be lower than the electrical resistance of the cover layer and higher than the electrical resistance of the sensing elements. The electrical resistance of the resistive layer can be higher than the resistance of a reference electrode layer below the sensing elements. The embodiment has the advantages as described above. More advantages will be described in reference to the exemplary figures.

In an embodiment according the invention, the electrically-resistive layer has a resistance suitable for causing, in response to a touch event above a center of a central sensing element, a detectable change in the capacitance as measured by sensing elements adjacent to the central sensing element. For example, the electrically resistive layer can have a resistance arranged so that a touch by a finger or stylus will result in a measurable change in capacitance in at least two, at least three, four, or five sensors along a line (e.g. a line in the X or Y direction, wherein X and Y indicate appropriate coordinate axes for the given sensor grid).

In an embodiment according the invention, the electrically-resistive layer has a sheet resistance of between 1 and 10,000 MOhm/sq, preferably between 20 and 5000 MOhm/sq, even more preferably between 100 and 1000 MOhm/sq. The electrical resistance layer can be arranged to have a resistance between 1 MOhm and 200 MOhm over the area touched by a finger or stylus.

In an embodiment according the invention, the electrically-resistive layer is formed as a high-resistive ITO layer on the cover layer.

In an embodiment according the invention, a sub-layer is provided between the cover layer and the sensor layer. In an embodiment according the invention, the electrically-resistive layer is a deposited layer on the sub-layer or the cover layer.

In an embodiment according the invention, the sub-layer comprises one or more of a polarizer layer, an anti-splinter film, an airgap layer, and an optical clear adhesive layer. In an embodiment according the invention, the sub-layer is also arranged as an anti-static layer.

In an embodiment according the invention, the touch panel device comprises a substrate layer to which the sensor layer is attached. In an embodiment according the invention, the substrate layer also comprising a reference electrode layer attached to the side opposite side the attached sensor layer.

In an embodiment according the invention, the touch panel device comprises a display layer and the cover layer is formed of a transparent material, such as glass. In an embodiment according the invention, the reference electrode layer is provided on the display layer. In an embodiment according the invention, the reference electrode layer is provided inside the display layer.

The invention further provides a touch panel device as described above, further comprising a processor arranged to register capacitance changes of each element of the plurality of sensing elements wherein the processor is adapted to determine a touch location by calculating a weighted location average of capacitance changes registered by a plurality of the touch panel devices.

The invention can be applied to various touch panel configuration, including such variants known as "discrete co-planar touch variant", "on-cell co-planar touch", and "window integrate co-planer touch" configurations.

Where in this application it is stated that a layer is "above" or "below" another layer, the relative directions above and below refer to a stack of layers in which the top layer is typically the cover layer ("touch layer", or outside layer), and the bottom layer may be a display layer (if any). The exemplary figures showing a cross section of a touch control panel also adhere to this convention.

The invention will now be described in detail in relation to coplanar touch sensors. However, it will be clear to the skilled person that the invention may also be applied to other types of capacitive touch sensor panels.

DETAILED DESCRIPTION OF THE EXEMPLARY EMBODIMENTS

First, coplanar touch panels will be described in some more detail.

Figure 1:
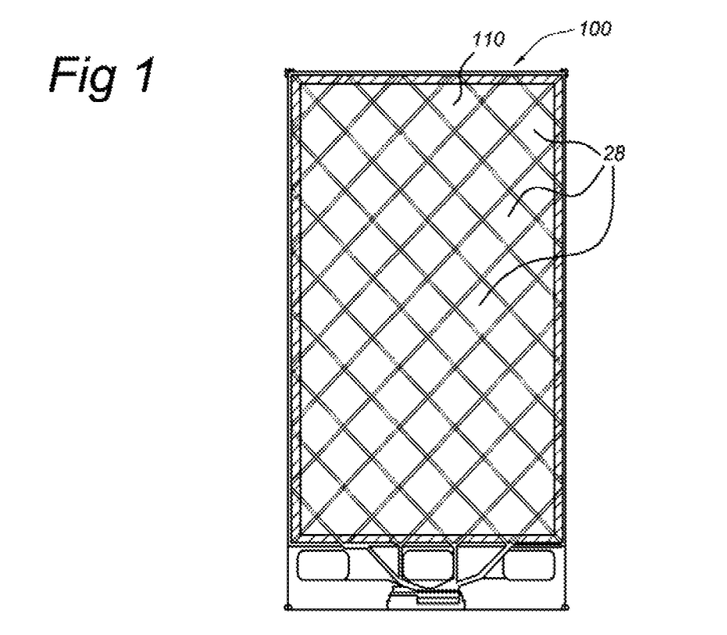
FIG. 1 schematically shows a top view of an electronic device comprising a touch panel device.

FIG. 1 schematically shows a top view of an electronic device 100 comprising a coplanar capacitive touch panel device. Examples of applications with such devices are mobile telephones, tablet computers and other portable devices. In addition, display-less (input) devices such as mouse pads and graphics tablets. The touch panel surface 110 of the electronic device 100 can be optimized for finger touches and stylus touches.

The touch panel surface 110 is divided in a number of touch sensors 28. In the example of FIG. 1 the sensors 28 form a diamond pattern, but other patterns are possible as well. Each sensor 28 comprises a touch sensing element 18 (not shown in FIG. 1) which can be independently read by a processor (not shown).

The touch panel surface 110 is typically protected by a glass cover layer. For electronics devices comprising a display 16, the display is typically provided underneath the touch panel surface 110, however also variants exist in which display and touch panel layers are intermixed or shared. More details of the layers will be disclosed in reference to FIGS. 2a-2c below.

Figure 2A:
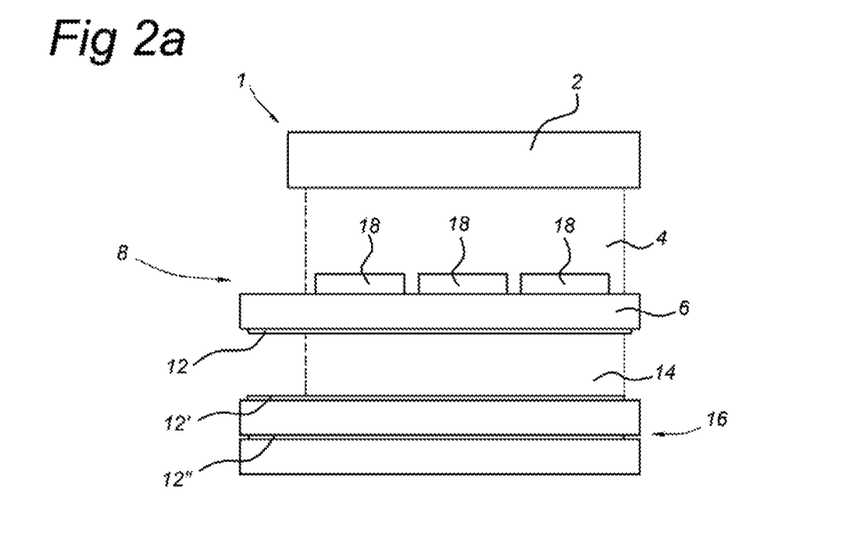
FIGS. 2a-2c schematically show cross section of touch panel device variants.
Figure 2B:
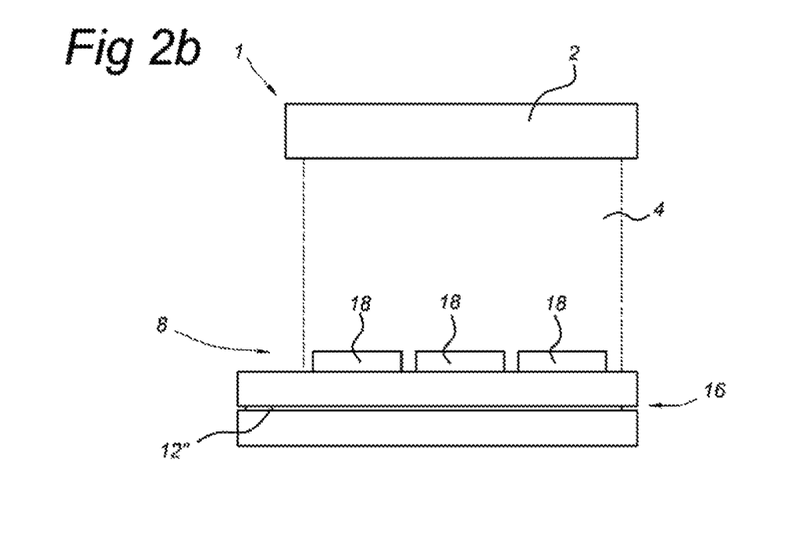
Figure 2C:
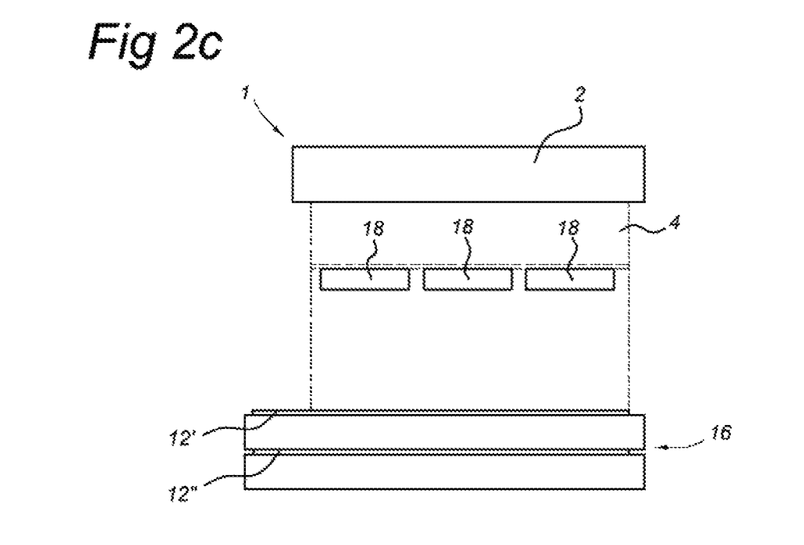

FIG. 2a schematically shows a cross section of a so-called "discrete co-planar touch" touch panel, while FIG. 2b shows an "on-cell co-planar touch" and FIG. 2c shows a "window integrated co-planar touch" touch panel configuration.

In FIG. 2a, the top layer is formed by transparent cover layer 2. This layer, which serves to protect the layers underneath from damage, is typically made of glass or another hard and transparent material in case the panel is used on top of a display layer 16. If no display is present (like in a mouse pad), a non-transparent protective layer may be used. In some cases, the glass cover layer is omitted, for example in order to reduce cost. In this case, the layer immediately below, which may for example be a polarizer layer, will serve as the cover layer 2 and as the surface that is to be touched by e.g. a finger or stylus. The term "cover layer" 2 thus does not necessarily refer to a glass top surface.

Beneath the cover window, sub-layer 4 is present. This layer can for example comprise an anti-splinter film to prevent the cover layer from falling apart into separate sharp pieces when broken. Sub-layer 4 can also be a polarizer layer, for example to work with display layer 16. Sub-layer 4 can also be formed of optical clear adhesive or simply an airgap (with double sided adhesive at the edges of the sensor).

Beneath sub-layer 4, the sensor layer 8 is located. This layer comprises separate touch sensing elements 18. The sensing elements 18 are provided on a substrate layer 6. Underneath the substrate layer 6 reference electrode layer 12 may be provided. Reference electrode layer 12 can provide a reference voltage. The touch sensing elements 18 can comprise Indium Tin Oxide (ITO), which is a suitable material for transparent sensors and tracks.

Beneath the substrate 6 to which the sensor layer 8 and reference electrode layer 12 are attached, another sub-layer 14 may be provided. This layer could again be an airgap, polarizer, adhesive layer, etc.

Below the sub-layer 14, the display layers 16 are provided. Such a display can for example be a Liquid Crystal Display (LCD) or organic light-emitting diode (OLED) display.

Instead of providing reference electrode layer 12 underneath the substrate 6, the reference voltage layer 12 may also be provided in other places of the stack, for example as a layer 12' on top of the display 16 or as a layer 12" inside the display stack 16. The function of the reference voltage layer 12, 12', 12" will be disclosed in reference to FIGS. 3a-3c. The reference voltage layer 12, 12', 12" can also be made of ITO.

As mentioned above, the display layer 16 may be absent, in which case the substrate 6 with reference electrode layer 12 and sensor layer 8, together with cover layer 2 forms a touch panel device, for example for use in mouse pads or graphics tablets.

FIG. 2b shows an alternative variant to the above described "discrete co-planar touch variant", the "on-cell co-planar touch". The main difference is that the sensor layer 8 comprising the touch sensing elements 18 is not provided on a separate substrate layer 6, but rather on the display layer 16. This saves an additional layer, and helps to reduce the size and production costs of the touch-panel display. In this case, the reference voltage layer is a layer 12" in the display stack 16.

FIG. 2c shows a further variant, the "window integrated co-planar touch" variant. Reference is made to published US patent application 2010/0 097 344 A1 by the same inventor which details several embodiments of this variant. Again the separate substrate layer 6 is absent, and the sensor layer 8 is provided on one of the sub-layers 4, 14. The sub-layer 4 is not required—the sensing elements 18 of the sensor layer 8 could also be provided directly on the cover layer 2 (see for example FIG. 3c). The reference electrode layer 12', 12" is provided respectively on or inside the display stack 16.

Figure 3A:
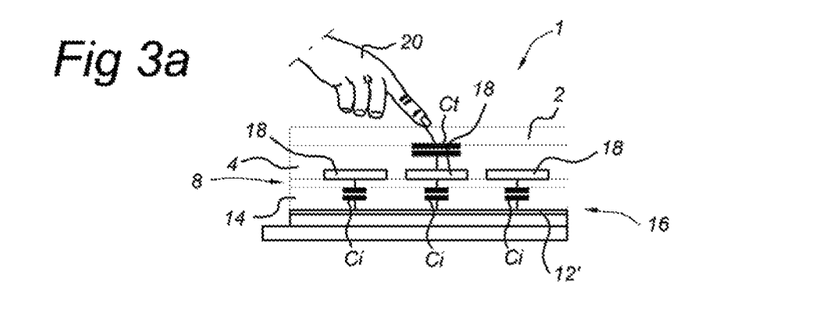
FIGS. 3a-3c schematically illustrate the functioning of touch panel device variants.
Figure 3B:
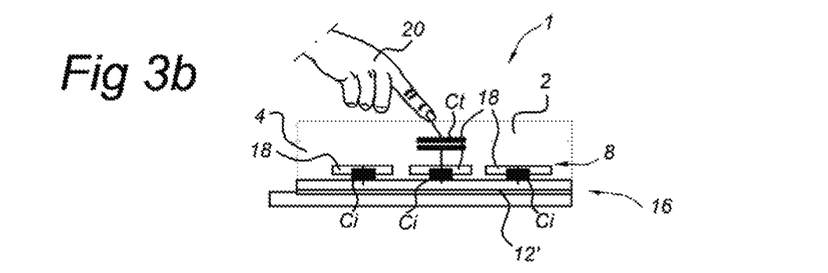
Figure 3C:
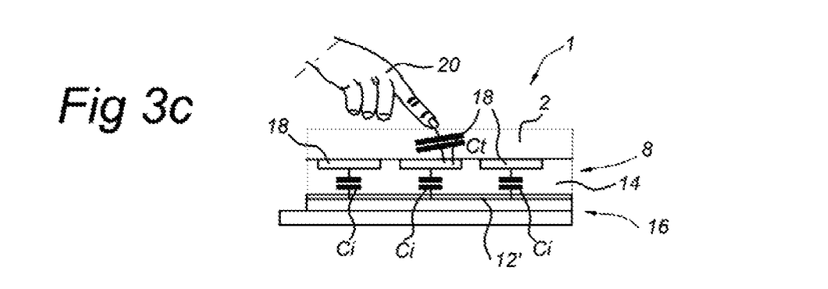

FIGS. 3a-3c schematically illustrate the functioning of the respective touch panel device variants of FIGS. 2a-2c. A finger 20 touches the cover layer 2 at a certain point. The cover window layer 2 is made of a non electrically conducting material, typically glass. The finger touching the window layer 2 influences the capacitance of the assembly of the touch panel layers 2 and 4 and finger 20. The capacitance is represented by the Ct ("touch") capacitance. Between touch sensing elements 18 in sensor layer 8 and the reference voltage layer 12, 12', or 12", the capacitance is represented by the Ci ("intrinsic") capacitance. This capacitance is assumed constant over time.

In each case of FIGS. 3a-3c, the touch panel configuration is provided with means (not shown) for determining, for each sensing element 18, the (change in) the sum of intrinsic capacitance $C_i$ (which is expected to be constant) and $C_t$ (the touch capacitance partly caused by finger 20). By detecting a change in capacitance, a touch event on or near a touch sensor can be detected. In addition, the magnitude of the change is an indication of the size or proximity (to the touch sensing element 18) of the touching object 20.

Figure 4A:
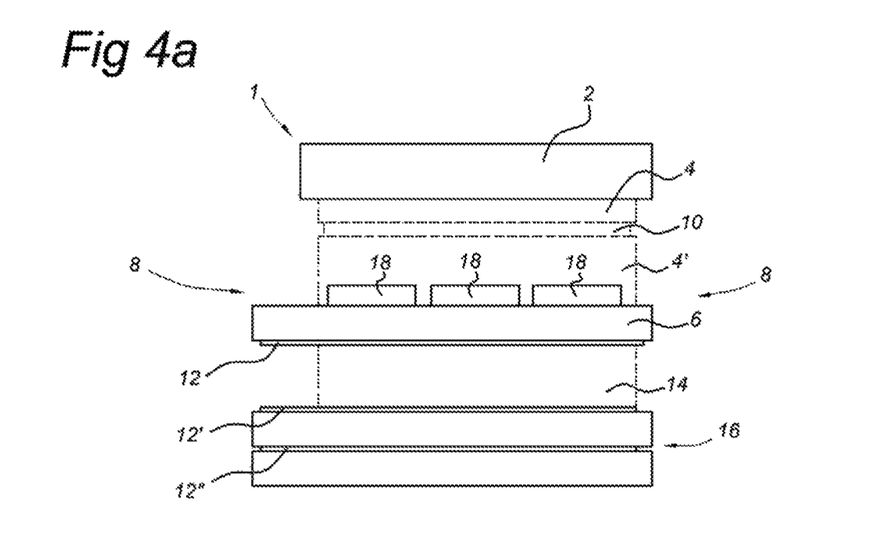
FIGS. 4a-4c schematically show cross sections of touch panel devices according the invention.
Figure 4B:
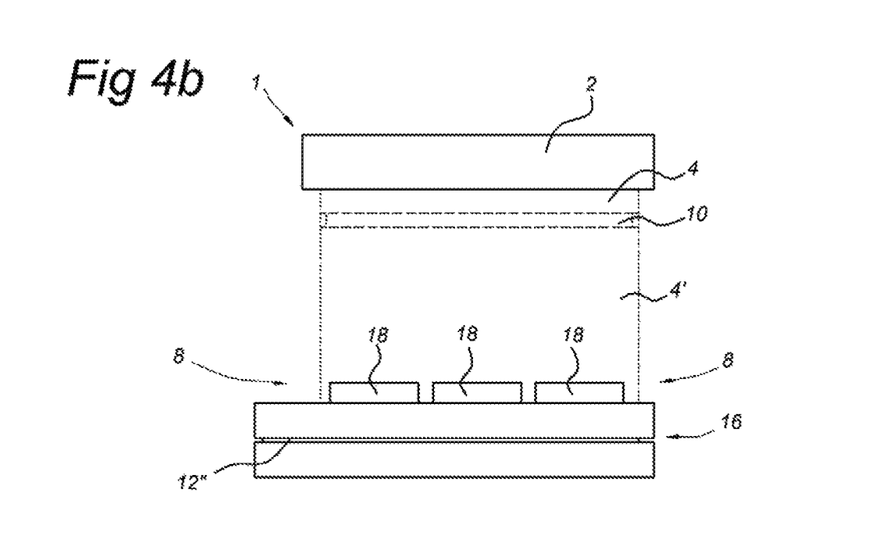
Figure 4C:
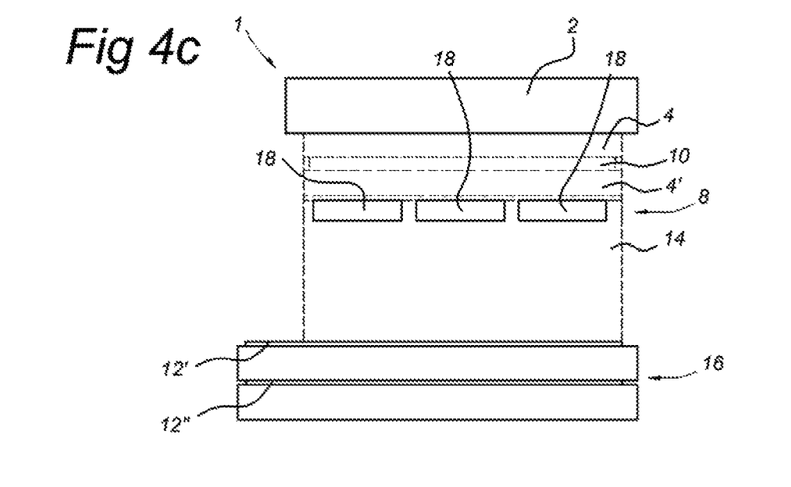

FIGS. 4a-4c schematically show cross sections of touch panel devices 1 according the invention. FIG. 4a again shows a "discrete co-planar touch" variant. The sub-layer 4 is now split into layers 4 and 4'. Between both sub-layers, a resistive layer 10 is provided. The top sub-layer 4 can comprise an anti-splinter film and/or a polarizer stack. The resistive layer 10 can be provided on this layer, e.g. by deposition. In an embodiment of the invention, the resistive layer has an electrical resistance which will be specified in more detail in reference to FIG. 5b. The sub-layer 4 may also be absent, and the resistive layer 10 can be provided on the underside of the window cover 2, i.e. between the window cover 2 and the sensor layer 8, again for example by deposition. The sub-layer 4' may comprise an airgap (with double-sided-adhesive only at edges of the sensor or sensor panel), optical clear adhesive, or an optical polarization stack.

FIGS. 4b and 4c respectively show an on-cell co-planar touch and an integrated window co-planar touch variant with the additional resistive layer 10 according to an embodiment of the invention. As in FIG. 4a, sub-layer 4 is split into two sub-layers 4 and 4', with resistive layer 10 provided between layers 4 and 4'. Alternatively, the resistive layer 10 could again be provided as a layer on the underside of the widow cover layer 2.

In reference to FIG. 4c, in an embodiment of the invention the layer 4' between the resistive layer 10 and the touch sensing elements 18 comprises a polarization stack or optical passivation coating. The resistive layer 10 can be deposited on the layer 4'.

Figure 5A:
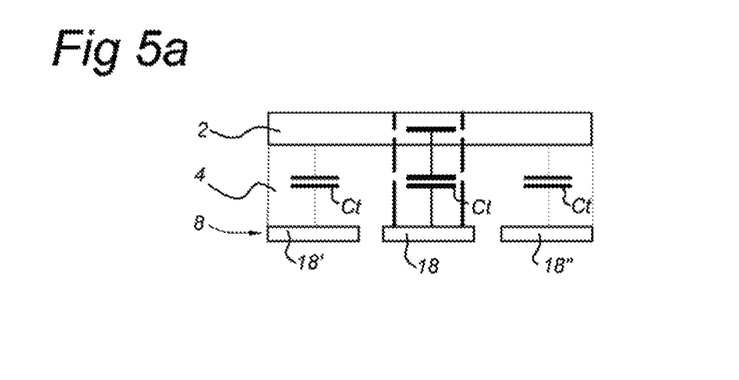
FIG. 5a schematically illustrates the functioning of a conventional touch panel device and FIG. 5b schematically illustrates the functioning of a touch panel device according the invention.

FIG. 5a schematically shows a cross section of a conventional touch panel display, comprising a cover window 2 providing a touch surface for finger 20 (not shown), and sensing elements 18, 18', and 18". Here the touch by finger 20 only significantly influences the capacitance $C_i+C_t$ as detected by the central element 18. The adjacent elements 18' and 18" do not register a change in capacitance.

Figure 5B:
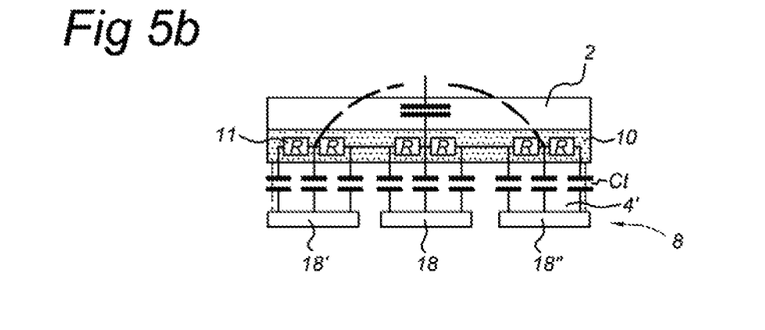

FIG. 5b schematically shows a cross section of a touch panel display with sensing elements 18, 18', 18" according to an embodiment of the invention. An additional resistive layer 10, here represented by a series of resistances 11 (R), is provided between the cover window 2 and sensing elements 18. The resistive layer 10 will cause the touch by a finger to also, through electrical conduction or, in other words, the fringe effect or capacitance spreading effect, influence the capacitances as detected by adjacent sensing elements 18' and 18". The addition of a high resistive, but not electrically insulating layer 10 between the touch input surface (the cover window) and the sensor array 8 thus increases the accuracy of the touch panel configuration by effectively increasing the number of sensors that sense a capacitance variation (induced by the touch event caused by object 20) and consequently contributes to a more accurate position calculation. The resistive layer 10 thus acts as a capacitance spreading layer.

The requirements for resistance of the capacitance spreading layer depend on the capacitance of the insulating layer 4' between sensors and the conductive layer formed by reference electrode 12, 12' or 12". The required resistance increases as the capacitance of the insulating layer decreases. For example, for a high capacitance (thin) insulating layer, where the capacitance is typically in the order of 1 mF/m$^2$, a typical sheet resistance of 30M Ohm/sq. over the touched area can be used. For a medium capacitance insulating layer, where the capacitance is typically in the order of 220 nF/m$^2$, a resistive layer sheet resistance of 150 MOhm/sq over the touched area can be used. Finally, for Low Capacitance (thick) Insulating Layers, with Capacitance in the order of 30 nF/m$^2$, a resistive layer resistance of 1.2 GOhm/sq over the touched area can be used. The resistance will thus typically be in the range 30 MOhm/sq-1.2 GOhm/sq. This translates for typical cases of panel and finger sizes (determining the touched area) to a layer 10 sheet resistance in the range 20 MOhm/sq-5000 MOhm/sq. Further example values are provided in table 1:

TABLE 1

Example electrical resistance values of the resistive layer 10 as a function of capacitance of the material between the cover surface 2 and the reference electrode 12

| Capacitance (µF/m$^2$) | Resistance (MOhm/sq) |
|---|---|
| 900 | 20-100 |
| 0.22 | 100-500 |
| 0.03 | 1000-5000 |

Figure 6A:
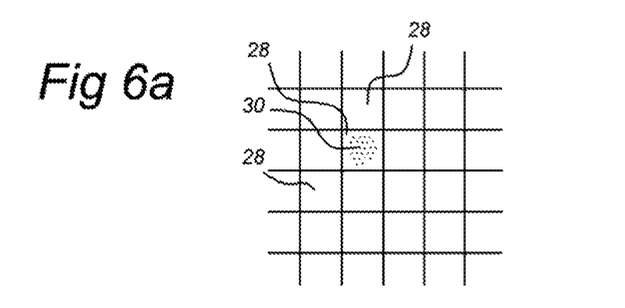
FIGS. 6a and 6b schematically show charge distributions corresponding to a touch event on the panels of FIGS. 5a and 5b respectively.
Figure 6B:
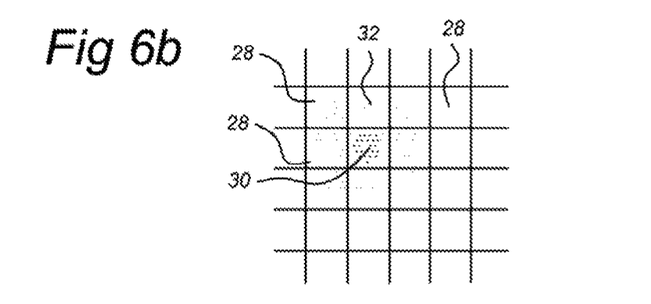

FIGS. 6a and 6b schematically show curves indicative of charge distributions corresponding to a touch event on the panels of FIGS. 5a and 5b respectively. Spot 30 indicates the touched area on the touch surface 110. In FIG. 6a, the spot 30 effectively covers only one sensor 28. In FIG. 6b, fringe area 32 schematically indicates the fringe area, overlapping a number of touch sensors 28, where the capacitance is significantly influenced due to the capacitance spreading effect of the resistive layer 10. Thus, the total area covered by spot 30 and fringe area 32 overlaps a plurality of sensors 28. In FIG. 6b, a total of 9 sensors 28 is influenced by the touch event (three sensors in a row in the X direction and three sensors in a row in the Y direction).

If in FIG. 6a, the spot 30 is located at a corner point of a sensor 28, then up to four sensors 28 may be influenced by the capacitance change. But if the finger moves just a little bit away from the corner, up to three of the four sensors may suddenly stop registering the capacitance change. This "on-off" behavior of conventional touch sensors is disadvantageous. In the case of FIG. 6b, always approximately 9 sensors are active, regardless of whether the touch is on the center of a sensor or on a corner.

Figure 7A:
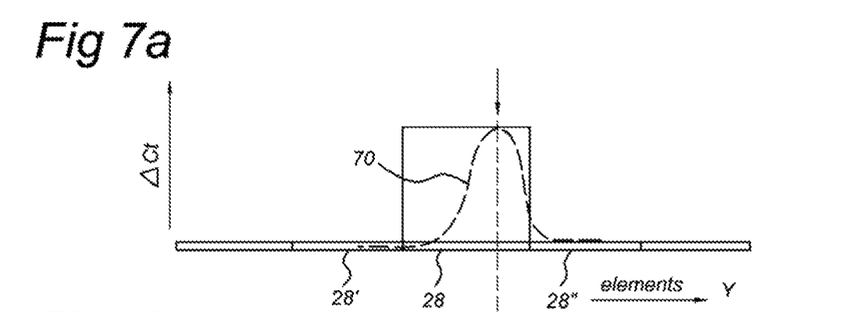
FIGS. 7a and 7b schematically show the change in capacitance as detected by an array of sensing elements along a Y axis.

FIG. 7a shows the change in capacitance as detected by a range of sensing elements along a Y axis (the North-South direction in FIG. 8) in a touch panel without the resistive layer 10. The arrow indicates the "true" position of the touch event, and the dashed line 70 corresponds to the "true" distribution of the capacitance change (of which FIG. 6a shows a top view). In this case, the change in capacitance is so limited that only the central sensor 28 registers a change, and the sensors to the north and the two sensors to the south register no change at all. This results in a "dead area", as the arrow can move over a distance within the sensor 28 without influencing the capacitance detection.

Figure 7B:
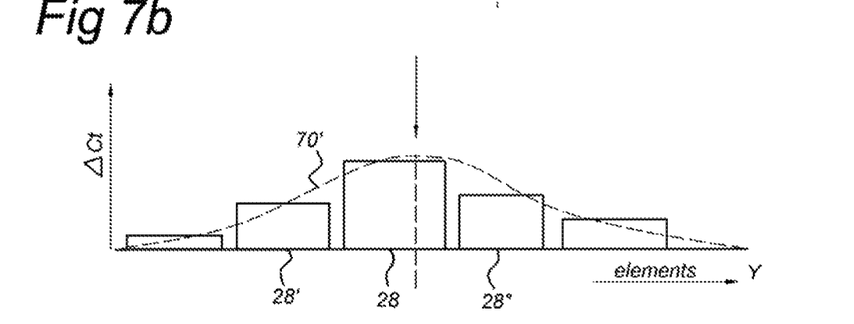

FIG. 7b shows the change in capacitance in a touch panel with resistive layer 10. Due to the resistive layer 10, the change in capacitance is more widely spread (the dashed curve 70' again represents the "true" capacitance distribution), so that now five sensors in a row detect a change. In principle it is possible to fit a suitable curve to the five measurements (e.g. a Bell curve) and determine the X, Y coordinates of the central position of the touching element. Other, less computationally expensive methods are also available for finding the maximum of the measured capacitance change distribution, such as weighted averages and parabolic or linear line fitting. In this case, there is no "dead area", since a small movement of the arrow in the central sensor 28 will immediately influence the balance between the capacitance detections in neighboring sensors 28' and 28", and thus be detectable.

While FIGS. 7a and 7b illustrate the principles of the capacitance distribution in 1 dimension (along axis Y), the same principles apply in 2 dimensions (X-Y directions).

Figure 8:
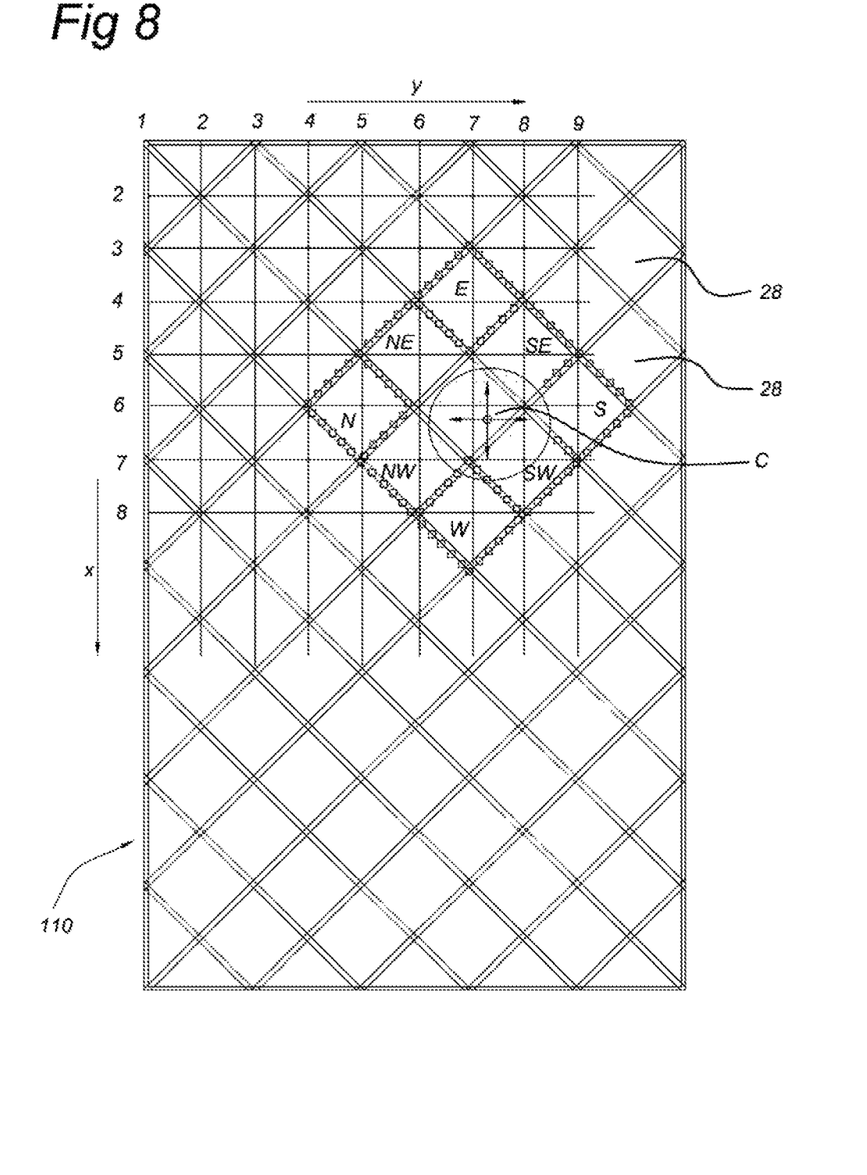
FIG. 8 schematically shows neighbouring sensors that are used in an algorithm for calculating the touch location, according to an embodiment of the invention.

FIG. 8 schematically shows a 2D overview of neighbouring sensors 28 (each comprising at least one sensing element 18) of which capacitance change values are used in an algorithm for calculating the touch location according to an embodiment of the invention. The algorithm for calculating the touch location may use not only the sensor with the highest 'capacitive touch response signal' but also adjacent sensors that may have been partly activated, as is illustrated in FIG. 7b.

FIG. 8 shows a central sensor C, which is indicated by the sensor which shows the maximum registered change in capacity. Neighboring or adjacent sensors are E (East) in the negative X direction, and W (West) in the positive X direction, N (North) in the negative Y direction and S (South) in the positive Y direction. Between S and E sensors, sensor SE (South-East) is located. Likewise NE (North-East) between N and E, SW (South-West) between S and W and NW (North-West) between N and W.

With S as the signal per sensor (in counts), the total of counts of sensors contributing to the X or Y location determination become respectively (the subscript refers to the sensor as described above):

$$S_{X\text{-}total}=[S_E+S_{NE}+S_{SE}+S_C+S_{NW}+S_{SW}+S_W]$$

$$S_{Y\text{-}total}=[S_N+S_{NE}+S_{NW}+S_C+S_{SE}+S_{SW}+S_S]$$

The values for the S-coefficients will typically depend on the proximity of the respective sensor to the central sensor along the axis (X or Y) of interest.

The weighted centroid locations in X and Y directions are now defined as:

$$X_{centroid} = \left[ \begin{array}{c} (X_E \cdot S_E) + (X_{NE} \cdot S_{NE}) + (X_{SE} \cdot S_{SE}) + (X_C \cdot S_C) + \\ (X_{NW} \cdot S_{NW}) + (X_{SW} \cdot S_{SW}) + (X_W \cdot S_W) \end{array} \right] / S_{X-total}$$

$$Y_{centroid} = \left[ \begin{array}{c} (Y_N \cdot S_N) + (Y_{NE} \cdot S_{NE}) + (Y_{NW} \cdot S_{NW}) + (Y_C \cdot S_C) + \\ (Y_{SE} \cdot S_{SE}) + (Y_{SW} \cdot S_{SW}) + (Y_S \cdot S_S) \end{array} \right] / S_{Y-total}$$

The coordinate pair (Xcentroid, Ycentroid) is thus a floating point value rather than a discrete value. Therefore, the use of a weighted algorithm in combination with a resistive layer 10 according the invention improves the accuracy of the touch event location detection.

While the above example is given in reference to the diamond pattern of FIGS. 1 and 9, the skilled person will be able to apply the example to other patterns, e.g. square grids, rectangular grids, etc. The skilled person will also be aware that other algorithms exist for calculating a floating point coordinate pair (X,Y) from a series of measurements at different discrete locations (C, E, SE, S, etc).

It is observed that, in the above specification, at several locations reference is made to "controllers" or "processors". It is to be understood that such controllers/processors may be designed in any desired technology, i.e. analogue or digital or a combination of both. A suitable implementation would be a software controlled processor where such software is stored in a suitable memory present in the touch panel device and connected to the processor/controller. The memory may be arranged as any known suitable form of RAM (random access memory) or ROM (read only memory), where such ROM may be any form of erasable ROM such as EEPROM (electrically erasable ROM). Parts of the software may be embedded. Parts of the software may be stored such as to be updatable e.g. wirelessly as controlled by a server transmitting updates regularly over the air.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A touch panel device, comprising:
   a cover layer;
   a sensor layer comprising a plurality of sensing elements, the plurality of sensing elements being arranged side by side;
   an electrically-resistive layer disposed between the cover layer and the sensor layer; and
   an adhesive layer disposed between the cover layer and the electrically-resistive layer,
   wherein the electrically-resistive layer spaces apart the cover layer by the adhesive layer of a first distance, and the electrically-resistive layer spaces apart the sensor layer by a second distance, wherein the first distance is defined as a distance from top of the electrically-resistive layer to bottom of the cover layer and the second distance is defined as a distance from bottom of the electrically-resistive layer to top of the sensor layer, and wherein the first distance is smaller than the second distance,
   wherein the electrically-resistive layer has an electrical resistance between 1 MOhm/sq and 10,000 MOhm/sq, and wherein the electrical resistance of the electrically-resistive layer is lower than an electrical resistance of the cover layer and higher than an electrical resistance of the plurality of sensing elements.

2. The touch panel device as claimed in claim 1, wherein the electrical resistance of the electrically-resistive layer is suitable for causing, in response to a touch event above a center of a central sensing element of the plurality of sensing elements, a detectable change in the capacitance as measured by at least two sensing elements of the plurality of sensing elements adjacent to the central sensing element.

3. The touch panel device as claimed in claim 1, wherein the electrical resistance of the electrically-resistive layer is between 20 MOhm/sq and 5000 MOhm/sq.

4. The touch panel device as claimed in claim 3, wherein the electrical resistance of the electrically-resistive layer is between 100 MOhm/sq and 1000 MOhm/sq.

5. The touch panel device as claimed in claim 1, wherein the electrically-resistive layer is formed on the underside of the cover layer.

6. The touch panel device as claimed in claim 1, wherein the adhesive layer is an optical clear adhesive layer.

7. The touch panel device as claimed in claim 6, wherein the electrically-resistive layer is a deposited layer on the adhesive layer.

8. The touch panel device as claimed in claim 1, wherein the sensor layer is attached on a substrate layer.

9. The touch panel device as claimed in claim 8, wherein the substrate layer comprises:
   a reference electrode layer attached to a side of the substrate layer opposite to another side of the substrate layer to which the sensor layer is attached.

10. The touch panel device as claimed in claim 1, wherein the touch panel device comprises a display module and the cover layer is formed of a transparent material.

11. The touch panel device as claimed in claim 10, wherein a reference electrode layer is provided on the display module.

12. The touch panel device as claimed in claim 11, wherein the reference electrode layer is further provided inside the display module.

13. The touch panel device as claimed in claim 1, wherein the touch panel comprises a processor which is arranged to register capacitance changes of each of the plurality of sensing elements, wherein the processor is adapted to determine a touch location by calculating a weighted location average of the capacitance changes registered by the plurality of sensing elements.

14. The touch panel device as claimed in claim 1, wherein the electrically-resistive layer is formed as a high-resistive indium tin oxide (ITO) layer.

* * * * *